United States Patent [19]

Hirohata

[11] Patent Number: 4,762,343

[45] Date of Patent: Aug. 9, 1988

[54] TUBE CONNECTOR

[75] Inventor: Toshio Hirohata, Yokohama, Japan

[73] Assignee: Nifco Inc., Yokohama, Japan

[21] Appl. No.: 96,046

[22] Filed: Sep. 11, 1987

[30] Foreign Application Priority Data

Sep. 29, 1986 [JP] Japan .................... 61-149162[U]

[51] Int. Cl.⁴ ............................. F16L 5/00
[52] U.S. Cl. .................. 285/158; 285/179; 285/184; 285/205; 285/330; 285/394; 285/423; 285/921; 285/194
[58] Field of Search .............. 285/192, 194, 205, 208, 285/209, 158, 179, 184, 330, 394, 423, 921

[56] References Cited

U.S. PATENT DOCUMENTS

| 1,394,982 | 10/1921 | Elder | 285/192 X |
| 2,707,967 | 5/1955 | Adams et al. | 285/158 X |
| 4,270,775 | 6/1981 | Noensie et al. | 285/158 X |
| 4,682,796 | 7/1987 | Parrow | 285/192 X |
| 4,687,235 | 8/1987 | Stoll | 285/158 X |

Primary Examiner—Dave W. Arola
Attorney, Agent, or Firm—Trexler, Bushnell, Giangiorgi & Blackstone, Ltd.

[57] ABSTRACT

A tube connector has a cylindrical socket for mounting in a hole of a plate and a connector securable to a desired one of a plurality of radially spaced-apart mounting positions of the socket and having opposite end cylindrical portions for tube connection provided on the axially opposite sides of the socket and communicating with each other.

1 Claim, 3 Drawing Sheets

TUBE CONNECTOR

BACKGROUND OF THE INVENTION

Field of the Invention

This invention relates to a tube connector to be used for connecting window washer tubes or the like for transporting window washer liquid supplied from a window washer tank to a window washer nozzle of an automobile.

In a window washer device provided on an automobile, window washer liquid stored in the window washer tank is forced out through a ductline to a window washer nozzle and jetted from the same onto a window glass.

The ductline, through which the window washer liquid passes, consists of a plurality of window washer tubes and connectors interconnecting these tubes. The connector is mounted, for instance, on a body panel for connecting a window washer tube provided on one side of the body panel and a window washer tube provided on the other side of the body panel.

The prior art connector mounted on the body panel has an intermediate portion, in which the body panel is clamped, and two cylindrical portions communicating with each other project from the opposite sides from the intermediate portion to the opposite sides of the body panel. At the time of the assembly of the automobile, window washer tubes are connected by pressure fitting on the two cylindrical portions, whereby the window washer tube provided on one side of the body panel and the window washer tube provided on the other side of the body panel are communicated with each other.

In such a prior art connector, the two cylindrical portions are made integral with the intermediate portion, and the cylindrical portions project integrally. Therefore, when it is desired to alter the direction of projection of the cylindrical portions with respect to a mounting plate, e.g., a body panel, by changing the position of the mounting panel or the like, it is necessary to use a separate connector having a different shape.

OBJECT AND SUMMARY OF THE INVENTION

An object of the invention is to provide a tube connector which is capable of readily altering the direction of projection of the cylindrical portions to which tubes are connected.

To attain the above object of the invention, the tube connector according to the invention comprises a cylindrical socket for mounting in a hole of a plate and a connector securable to a desired one of a plurality of radially spaced-apart mounting positions of the socket and having opposite end cylindrical portions for tube connection provided on the axially opposite sides of the socket and communicating with each other.

With the tube connector of the above construction the socket is provided with a plurality of radially spaced-apart mounting positions, at which the connector is mounted on the socket so that it is possible to change the direction, in which the cylindrical portions of the connector project, depending on the position of the tube to be connected.

For the mounting on the plate, the connector may be preliminarily mounted on the socket, and the socket is then mounted on the plate. Alternatively, the socket may first be mounted on the plate, and then the connector may be insertedly secured to the socket.

The above and other objects and features of the invention will become more apparent from the following detailed description with reference to the accompanying drawings.

DETAILED DESCRIPTION OF THE PREFERRED EMBODIMENT

Figure 1:
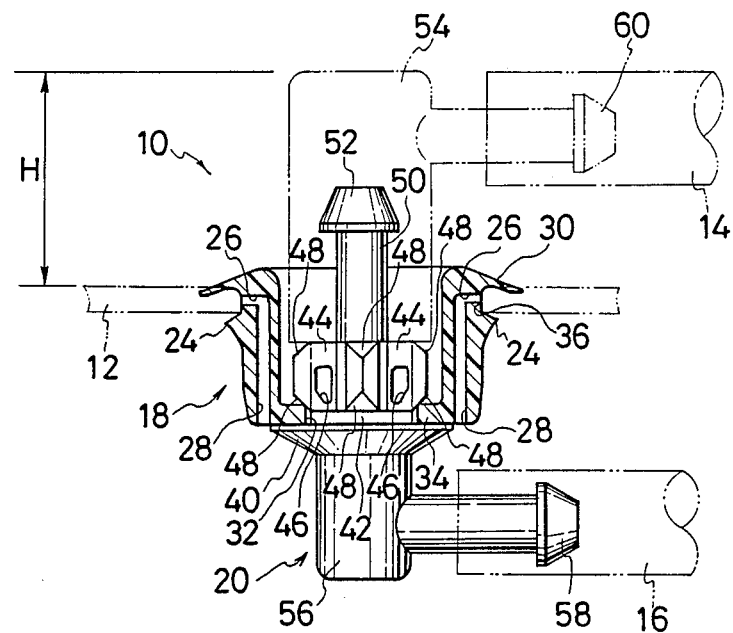
FIG. 1 is a front view, partly in section, showing an embodiment of the tube connector according to the invention.

The drawings illustrate an embodiment of the tube connector according to the invention. In this embodiment, the tube connector 10 is used for the connection of a washer tube 14 provided on one side of a body panel 12 and a washer tube 16 provided on the other side of the body panel 12. The tube connector 10 consists of a cylindrical socket 18 and a connector 20, and the connector 20 is fitted in the socket 18. The socket and connector are one-piece synthetic resin moldings.

Figure 2:
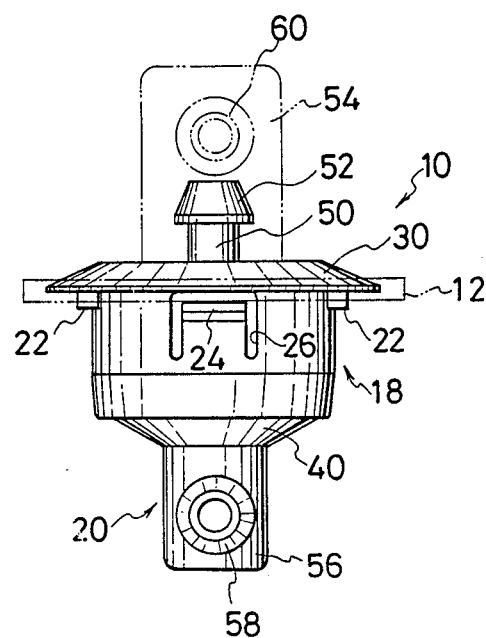
FIG. 2 is a right side view showing a tube connector shown in FIG. 1.
Figure 3:
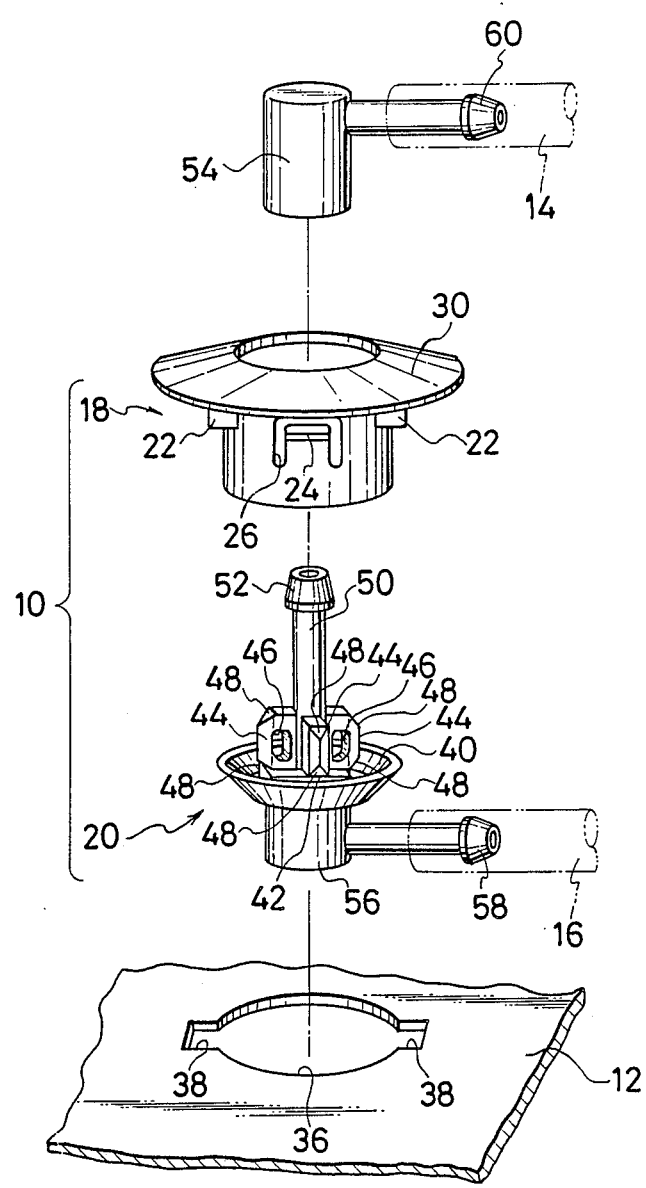
FIG. 3 is an exploded perspective view showing the tube connector shown in FIG. 1.
Figure 5:
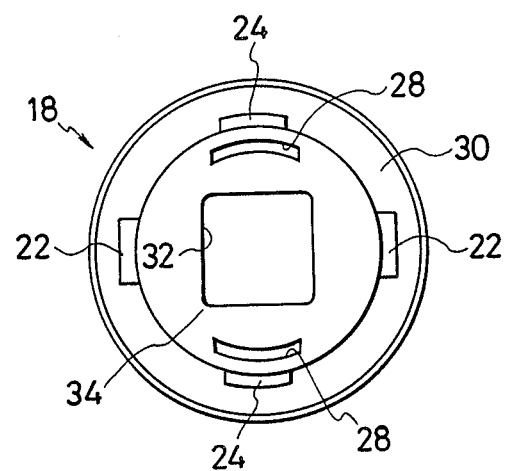
FIG. 5 is a bottom view showing a socket of the tube connector.

As shown in FIG. 3, the socket 18 is cylindrical. As shown in FIG. 5, its outer periphery is provided with two engagement pawls 22 extending in radially opposite directions and two engagement pawls 24 provided between the two engagement pawls 22 and extending in radially opposite directions. As shown in FIGS. 2 and 3, the engagement pawls 24 are in the form of cantilevers, and each of them has a U-shaped notch 26 formed in the peripheral edge portion when viewed in the radial direction and, as shown in FIG. 5, has an axially inward hole 28 communicating with the notch 26. The free end of the engagement pawl 24 can be warped in the radial direction.

One axial end of the socket 18 is formed with a bevel-like portion 30, which extends radially, the thickness of which becomes progressively thin toward the edge, and which can be deformed elastically in the axial direction. The axial end of the socket opposite the bevel-like portion 30 is closed by a bottom 34 having a rectangular hole 32 formed in the axial portion. As shown in FIG. 5, the rectangular hole 32 has arcuate corners and is free from any sharp edge.

When this socket 18 is inserted from its end opposite the bevel-like portion 30 into a mounting hole 36 formed in the body panel 12, as shown in FIG. 3, the two engagement pawls 22 are engaged in two notches 38 formed in a face-to-face relation in the inner periphery of the mounting hole 36, thus preventing rotation about the axis. The engagement pawls 24 are thus temporarily elastically deformed to penetrate the mounting hole 36, thus clamping the body panel 12 between the bevel-like portion 30 and the engagement pawls 24. In this way, the socket 18 is mounted on the body panel 12. In order to ensure reliable engagement of the engagement pawls 24 with the edge of the mounting hole 36 of the body panel 12 after insertion at the time of the insertion of the socket 18, as shown in FIG. 1, it is necessary that the end of the bevel-like portion 30 strike the surface of the body panel 12 and be elastically deformed upwardly with respect to the state shown in FIG. 1 at the time of the insertion of the socket 18.

The connector 20 has a bevel-like portion 40, which is provided in an axially intermediate portion and extends in radial directions. The bevel-like portion 40 is such that its thickness becomes thinner toward the edge and is elastically flexible in the axial direction.

Figure 4:
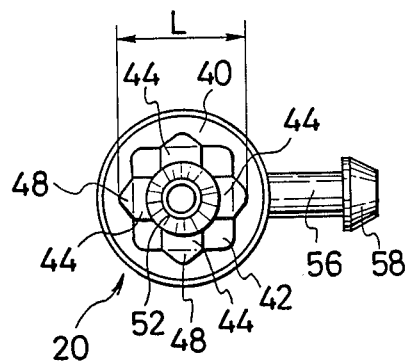
FIG. 4 is a plan view showing a connector of the tube connector.

As shown in FIG. 4, a rectangular portion 42 is formed above and continuously with the bevel-like portion 40. The rectangular portion 42 is formed such that it corresponds to the rectangular hole 32 of the socket 18, and it has such a size that it can fit into the rectangular hole 32. The rectangular portion 42 can fit into the rectangular hole 32 when the end of the bevel-like portion 40 strikes the bottom 34 and is elastically deformed in the axial direction.

Above the bevel-like portion 40, four projecting walls 44 continuous to the rectangular portion 42 are formed such that they project radially. As shown in FIG. 4, the projecting walls 44 are spaced apart at an angular interval of 90 degrees at positions at an angle of 45 degrees with respect to the diagonals of the rectangular section 42 when viewed in the axial direction. As shown in FIG. 1, each of the projecting walls 44 has a through hole 46 formed in a central portion, so that it can be elastically contracted in radial directions.

As shown in FIG. 4, each of the projecting walls 44 has a tapering radial end portion, the width of which reduces gradually when viewed in the axial direction. The axially opposite ends of the tapering radial end portions each have a tapering surface 48, as shown in FIG. 1, tapering toward the end. The distance L between the opposite ends of the projecting walls 44 (as shown in FIG. 4) is smaller than the length of the diagonal of the rectangular hole 32 of the socket 18 and greater than the distance between the opposed sides of the rectangular hole 32.

Thus, the projecting walls 44 can be inserted into the rectangular hole 32 by turning then from the state shown in FIG. 4 by 45 degrees to a position corresponding to the rectangular hole 32. The rectangular portion 42 can be made to correspond to the rectangular hole 32 by inserting the projecting walls 44 into the rectangular hole 32 and then causing rotation of the socket 18 and connector 20 about the axis by 45 degrees.

A cylindrical portion 50 projects upright from the neighborhood of the top of the projecting walls 44. The end of the cylindrical portion 50 is formed with an increased diameter portion 52. An end of an elbow 54 is fitted on the cylindrical portion 50 in contact with the upper surface of the projecting walls 44. The other end of the elbow 54 is formed with an increased diameter portion 60, to which a washer tube 14 is connected by pressure fitting.

A substantially L-shaped cylindrical portion 56 extends from the bottom of the bevel-like portion 40 and communicates with the cylindrical portion 50. The free end of the L-shaped portion is formed with an increased diameter portion 58, to which an end of a washer tube 16 is connected by pressure fitting.

Now, the procedure of fitting the socket 18 on the connector 20 will be explained.

The connector 20 is fitted on the socket 18 before mounting the socket 18 on the body panel 12. To fit the connector 20 on the socket 18, the projecting walls 44 of the connector 20 are inserted into the rectangular hole 32 by bringing it to a position corresponding to the diagonal of the rectangular hole 32 of the socket 18. In this state, the rectangular portion 42 is at a position shifted from the rectangular hole 32 in the axial direction. Therefore, the rectangular portion 42 engages the lower surface of the bottom 34, so that the rectangular portion 42 cannot enter the rectangular hole 32. Then, the connector is turned about the axis relative to and coaxially with the socket 18. In this state, the minimum gap between the tapering surface 48 and bevel-like portion 40 is preferably made smaller than the thickness of the bottom 34. Thus, the tapering surfaces 48 of the projecting walls 44 are brought into contact with the inner periphery of the rectangular hole 32 to provide resistance against the relative rotation of the socket 18 and connector 20. However, the relative rotation is permitted through elastic deformation of at least the projecting walls 44 or the inner edge of the rectangular hole 32.

When the relative rotation of the socket 18 and connector 20 is caused, a force tending to cause movement of the connector 20 upwards in FIG. 1 relative to the socket 18 is produced by the action of the tapering surfaces 48. Also, when relative rotation has proceeded by an angle of 45 degrees, the rectangular portion 42 comes to a position corresponding to the rectangular hole 32 and is fitted in the rectangular hole 32 by causing elastic deformation of the bevel-like portion 40 in the axial direction, whereby the bottom 34 of the connector 20 is clamped between the tapering surfaces 48 and bevel-like portion 40.

In this way, the connector 20 is fitted on the socket 18 by inserting the projecting walls 44 into the rectangular hole 32 by bringing them to a position corresponding to the diagonal of the rectangular hole 32 of the socket 18 and causing rotation of the socket 18 about the axis by 45 degrees. Thus, it is possible to change the mounting position of the connector 20 with respect to the socket 18 at angular intervals of 90 degrees.

When the socket 18 and connector 20 are fitted together, by passing the L-shaped cylindrical portion 56 of the connector 20 through the mounting hole 36 of the body panel 12 and inserting the socket 18 downwards in FIG. 1 from its end opposite the bevel-like portion 30 into the mounting hole 36, thus providing a large urging force, the engagement pawls 24 of the socket 18 are engaged in the notches 38, and the engagement pawls 24 of the socket 18 penetrate the mounting hole 36 to be fitted toward the opposite side surface. At this time, the engagement pawls 24 are temporarily contracted and then expanded to engage with the opposite side of the mounting hole 36. In this way, the connector 20 is mounted on the body panel 12 by the socket 18.

After the connector 20 has been mounted on the body panel 12, the washer tube 14 is connected to the cylindrical portion 50 of the connector 20 by the elbow 54, and the other washer tube 16 is connected to the cylindrical portion 56 of the connector 20. In this way, the washer tubes 14 and 16 are communicated with each other.

In this state, the elbow 54 is fitted with its lower end in contact with the top of the projecting walls 44. Thus, the lower end of the elbow 54 is inserted to a great extent into the socket 18, thus reducing the height H of projection from the body panel 12 (as shown in FIG. 1).

Since the mounting position of the connector 20 with respect to the socket 18 can be changed at angular intervals of 90 degrees, the direction in which the cylindrical portion 56 of the connector 20 projects in the connected state is adjustable to a desired direction by preliminarily fitting, the connector 20 on the socket 18 such that it has a desired orientation.

In the above embodiment, the connector 20 is mounted on the socket 18 by turning it by an angle of 45 degrees. However, it is possible to provide any other mounting structure instead.

Further, in the above embodiment the connector 20 is fitted on the socket 18, and then the connector 20 and socket 18 are mounted on the body panel 12. However, it is possible to mount the socket 18 on the body panel 12 and then fit the connector 20 on the socket 18.

As has been described in the foregoing, with the tube connector according to the invention the socket has means of securing it in a mounting hole of a plate and means for securing the connector having opposite end cylindrical portions for tube connection by selecting the direction in which the cylindrical portions project. Thus, it is possible to readily change the direction of the cylindrical portions depending on the position of a tube to be connected.

What is claimed is:

1. A tube connector comprising a cylindrical socket for mounting in a hole in a plate or the like, said socket having external means for keying said socket in said hole in a predetermined position, said socket further having resilient retainer means for snapping through said hole to retain said socket in said plate or the like, said socket further having adjacent an upper edge thereof a resilient circumferential flange of frusto-conical configuration for resiliently bearing against a face of said plate or the like opposite said retainer means, and said socket further having a hollow core with a transverse lower wall, said well having a regular polygonal aperture with a predetermined number of sides therethrough, and a connector interfitting with said socket and including a lower cylindrical portion, an upper cylindrical portion upsatnding from said lower cylindrical portion, a lateral tubular portion extending from said lower cylindrical portion, said upper and lower cylindrical portions and said lateral tubular portion having a continuous bore therethrough, a lateral resilient flange of frusto-conical configuration resiliently engageable with said wall of said socket from an underside thereof, a polygonal portion complementary to said polygonal aperture and of said predetermined number of sides disposed adjacent said lateral resilient flange, and a plurality of vertical resilient walls above said polygonal portion and extending radially from said upper cylindrical portion, said walls being of said predetermined number and equally arcuately spaced so that said walls are respectively spaced midway between apices of said polygonal portion, said connector being axially insertable into said socket through said socket wall with said walls directed toward the apices of said aperture in said socket wall, and thereafter turnable to dispose said polygonal portion complementarily in said polygonal aperture with said walls disposed against an upper surface of said socket wall.

* * * * *